United States Patent
Thorson et al.

(10) Patent No.: US 7,096,026 B2
(45) Date of Patent: Aug. 22, 2006

(54) METHOD AND APPARATUS FOR REDUCING CALL SETUP TIME IN A WIRELESS COMMUNICATION SYSTEM

(75) Inventors: Dean E. Thorson, Grayslake, IL (US); Takeshi Morishima, Hoffman Estates, IL (US); Samer A. Nabulsi, Woodridge, IL (US); Anal R. Shah, Gujarat (IN)

(73) Assignee: Motorola, Inc., Schaumburg, IL (US)

( * ) Notice: Subject to any disclaimer, the term of this patent is extended or adjusted under 35 U.S.C. 154(b) by 39 days.

(21) Appl. No.: 10/622,815

(22) Filed: Jul. 18, 2003

(65) Prior Publication Data

US 2005/0014506 A1    Jan. 20, 2005

(51) Int. Cl.
   *H04Q 7/20* (2006.01)
(52) U.S. Cl. .......... 455/450; 455/422.1; 455/453; 455/455; 455/509; 455/507; 455/403; 370/328; 370/329; 370/331; 370/431
(58) Field of Classification Search ........ 455/418, 455/416, 500, 403, 414.1, 450, 442, 436, 455/439, 438, 422.1, 453, 455, 509, 507; 370/329, 352, 401, 336, 328, 331, 431
   See application file for complete search history.

(56) References Cited

U.S. PATENT DOCUMENTS

| | | | | |
|---|---|---|---|---|
| 5,754,957 A * | 5/1998 | Khan | .......... | 455/436 |
| 5,956,645 A * | 9/1999 | Harper et al. | .......... | 455/466 |
| 6,577,874 B1 * | 6/2003 | Dailey | .......... | 455/521 |
| 6,633,554 B1 * | 10/2003 | Dalal | .......... | 370/331 |
| 6,987,982 B1 * | 1/2006 | Willenegger et al. | ....... | 455/515 |
| 6,993,342 B1 * | 1/2006 | Kuchibhotla et al. | ....... | 455/450 |
| 2002/0034166 A1 * | 3/2002 | Barany et al. | .......... | 370/329 |
| 2003/0081577 A1 * | 5/2003 | Jimenez | .......... | 370/336 |
| 2003/0143989 A1 * | 7/2003 | Ho et al. | .......... | 455/418 |
| 2004/0192312 A1 * | 9/2004 | Li et al. | .......... | 455/445 |
| 2004/0203469 A1 * | 10/2004 | Patel et al. | .......... | 455/67.14 |

FOREIGN PATENT DOCUMENTS

| | | |
|---|---|---|
| EP | 0 872 982 A1 | 10/1998 |
| WO | WO 03/017621 A1 | 2/2003 |
| WO | WO 03/017712 A2 | 2/2003 |

OTHER PUBLICATIONS

3 G 3rd Generation Partnership Project 2 "3GPP2", Signaling Link Access Control (LAC) Standard for cdma2000 Spread Spectrum Systems-Addendum 2, 3GPP2 C.S0004-A-2, version 1.1, Feb. 2002, section "2.2.2.1 ARQ Sublayer".

* cited by examiner

*Primary Examiner*—George Eng
*Assistant Examiner*—Khai Nguyen
(74) *Attorney, Agent, or Firm*—Jeffrey K. Jacobs

(57) ABSTRACT

The need for reducing the time required for call setup in a wireless communication system (100) is addressed herein. A base station (BS 104) sends a channel assignment message to a mobile station (MS 102) and performs traffic channel initialization procedures with the MS. After completing the traffic channel initialization procedures, the BS sends a base station acknowledgment message to the MS and proceeds to transmit signaling to the MS without waiting to receive an MS acknowledgment in response to the base station acknowledgment message. Thus, the time normally taken to receive the MS acknowledgment is saved and call setup time reduced.

18 Claims, 6 Drawing Sheets

300

400

500

Prior Art

600

METHOD AND APPARATUS FOR REDUCING CALL SETUP TIME IN A WIRELESS COMMUNICATION SYSTEM

FIELD OF THE INVENTION

This invention relates in general to wireless communication systems, and more specifically to a method and apparatus for reducing call setup time in a wireless communication system.

BACKGROUND OF THE INVENTION

Prior-art wireless communication systems employ specific messaging sequences to initialize a connection between a base station and a mobile station. However, the time taken to transfer these messaging sequences contributes to the total call setup time a user experiences for each call that is made. Lower-latency services such as push-to-talk (PTT) are more sensitive to this total call setup time. Users expect "instantaneous" communication when they use a PTT service, for example. Having to wait more than a few seconds can be a significant turn-off to users. Therefore, longer call setup times diminish the value of PTT as an instant communication service relative to well-known cellular communication services. Thus, a need exists for an apparatus and method for reducing the time required for call setup in a wireless communication system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF EMBODIMENTS

The need for reducing the time required for call setup in a wireless communication system is addressed herein. A base station (BS) sends a channel assignment message to a mobile station (MS) and performs traffic channel initialization procedures with the MS. After completing the traffic channel initialization procedures, the BS sends a base station acknowledgment message to the MS and proceeds to transmit signaling to the MS without waiting to receive an MS acknowledgment in response to the base station acknowledgment message. Thus, the time normally taken to receive the MS acknowledgment is saved and call setup time reduced.

In overview form the present disclosure concerns wireless communication systems that provide service for communications units or more specifically a user thereof operating therein. More particularly, various inventive concepts and principles, embodied as a method and apparatus for reducing the time required for call setup in a wireless communication system, are discussed and disclosed. The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Figure 1:
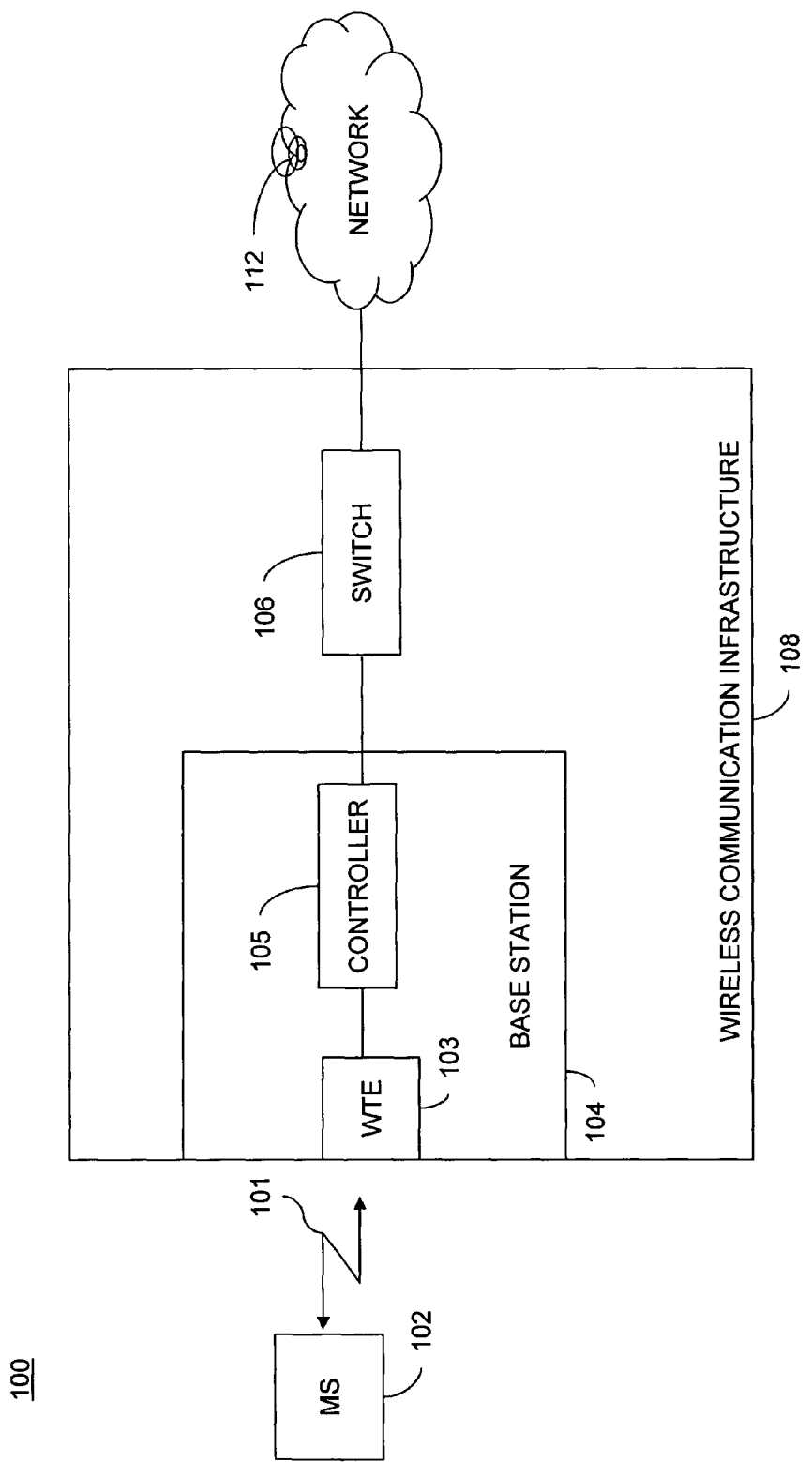
FIG. 1 is an electrical block diagram of a wireless communication system in accordance with embodiments of the present invention.

The disclosed embodiments can be more fully understood with reference to FIGS. 1–6. FIG. 1 is a block diagram depiction of wireless communication system 100 in accordance with embodiments of the present invention. System 100 is a well-known Code Division Multiple Access (CDMA) system, specifically a CDMA2000 system, which is based on the Telecommunications Industry Association/Electronic Industries Association (TIA/EIA) standard IS-2000 and TIA-2001, suitably modified to implement the present invention. (The TIA/EIA can be contacted at 2001 Pennsylvania Ave. NW, Washington, D.C. 20006). Alternative embodiments of the present invention may be implemented in communication systems that employ other technologies such as, but not limited to, IS-95, WCDMA (Wideband CDMA), HRPD (TIA-878-1 and TIA-1878), "iDEN," "WiDEN," GSM, GPRS, UMTS, and EDGE. Embodiments of the present invention include wireless communication infrastructure 108 and mobile station (MS) 102. They also include known entities such as switch 106 and network 112, which may include for example a mobile switching center and public switched telephone network, respectively. Although referred to as mobile phones, MSs in the present invention are not limited to mobile phones. For example, an MS may comprise all manner of devices connected to the wireless communication infrastructure such as computers (e.g., desktops and laptops), personal data assistants (PDAs), gaming devices, etc.

Wireless communication infrastructure 108 communicates with MS 102 via CDMA2000 air interface resource 101. Resource 101 comprises a variety of well-known channel types, such as access channels, paging channels, and traffic channels. Some of these channels, such as traffic channels, are dynamically assigned and de-assigned to provide user services as requested.

Those skilled in the art will recognize that FIG. 1 does not depict all of the network equipment necessary for system 100 to operate but only those system components and logical entities particularly relevant to the description of embodiments of the present invention. For example, base station 104 is depicted as including wireless transceiver equipment (WTE) 103 and controller 105. In some embodiments consistent with wireless communication infrastructure 108, WTE 103 is included within one or more base transceiver stations (BTSs).

Controller 105 can be implemented using well-known components such as processors, memory, and/or logic circuitry designed to implement algorithms that have been expressed as computer instructions and/or in circuitry. Given an algorithm or a logic flow, those skilled in the art are aware of the many design and development techniques available to implement a controller that performs the given logic. For example, a controller consistent with the present invention may be incorporated into well-known system components (such as a BTSs, e.g.) or distributed across well-known system components (such as BTSs and/or base site controllers, e.g.).

Figure 2:
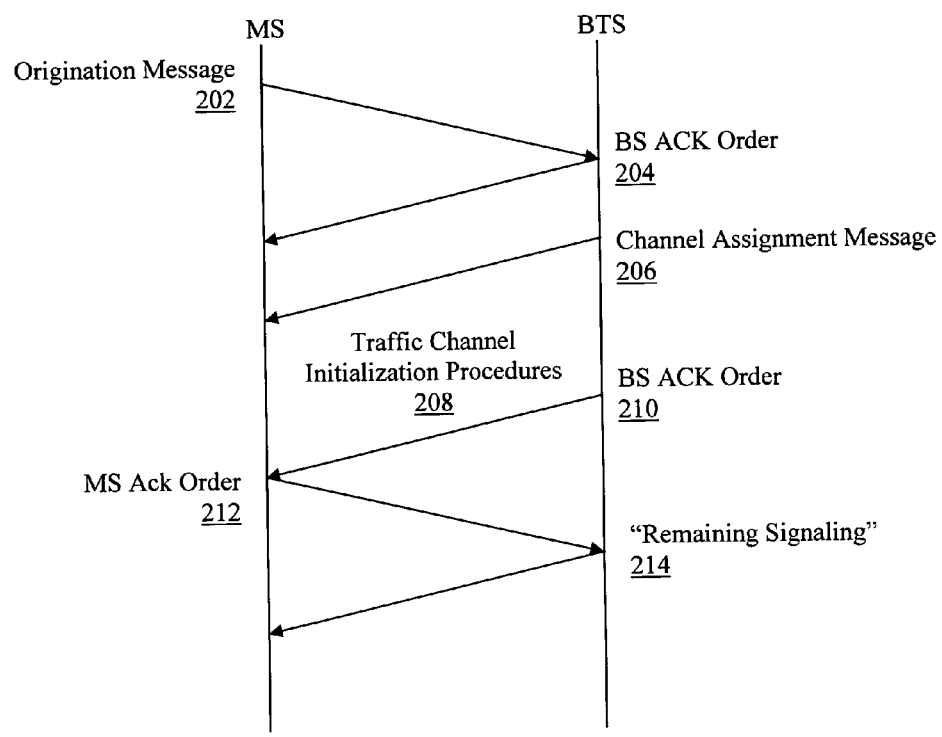
FIG. 2 is a diagram depicting a prior art call setup messaging sequence.

FIG. 2 is a diagram depicting a prior art call setup messaging sequence 200 that is used to initialize a connection between a mobile unit and a base station in a wireless communication system. The vertical axis represents time but is but is neither uniform nor depicted to scale. The prior art call setup messaging sequence 200 is sent typically on a forward link by one or more base stations in response to an origination request 202 received from the mobile unit. The prior-art messaging sequence 200 is usually a serial sequence, which includes a channel assignment 206, traffic channel initialization procedures 208, followed by an exchange of BS ACK Order 210 and MS ACK Order 212 on the forward and reverse traffic channels. In the prior art, traffic channel initialization procedures can involve the transmission of forward link frames by a base station, the reception of at least two of these frames consecutively by a mobile station, then the transmission of a preamble sequence (or reverse pilot or null frames) by the mobile station that the base station receives to "acquire" the mobile.

The exchange of the BS ACK Order 210 and the MS ACK Order 212 is included in the call setup messaging sequence 200 prior to the remaining signaling 214 to confirm that the signaling mechanisms are working prior to proceeding with the remaining signaling 214. This confirmation proves to the base station that the mobile station can receive base station transmissions. However, this exchange of the BS ACK Order 210 and the MS ACK Order 212 can take a significant amount of time during the call setup process, as many as 240 ms, for example.

Figure 3:
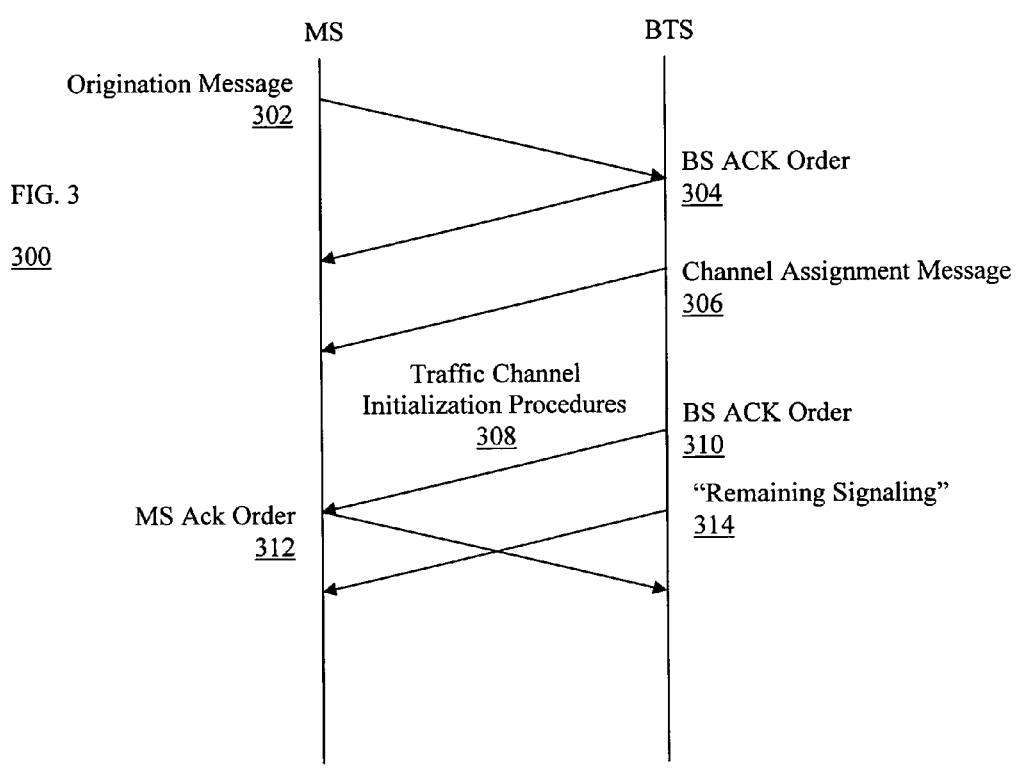
FIG. 3 is a diagram depicting a first embodiment of the invention in a wireless communication system.

FIG. 3 is a diagram depicting a first embodiment of an enhanced call setup messaging sequence 300 that can be used to initialize the connection between a mobile unit and a base station in a wireless communication system. The vertical axis represents time but is neither uniform nor depicted to scale. The enhanced call setup messaging sequence 300 preferably is sent on the forward link by base station 104 in response to an origination request 302 received from mobile unit 102. In the enhanced call setup messaging sequence 300, transmission of the remaining signaling 314 preferably proceeds immediately following the BS ACK Order 310, that is, without waiting for the reception of the MS ACK Order 312. In the first embodiment, the remaining signaling 314 includes signaling related to service negotiation, data burst handling, handoff processing, and/or authentication. For example, depending upon the state of mobile 102, the signaling may include service request messaging, service connect messaging, status request messaging, and/or handoff messaging.

The enhanced call setup messaging sequence 300 improves upon the prior art call setup messaging sequence 200 in that the stimulus for transmission of the remaining signaling 314 is changed from reception of the MS ACK Order 312 to transmission of the BS ACK Order 310. This improvement saves the time normally taken for transmission of the BS ACK Order 310 and reception of the MS ACK Order 312. The savings can be 240 ms.

This enhancement is available because the stimulus for transmission of the BS ACK Order 310 is completion of the traffic channel initialization procedures 308. During the prior art traffic channel initialization procedures 308, base station 104 waits for a transmission from mobile station 102 that indicates that mobile station 102 has received sufficient forward link frames transmitted by base station 104. Thus, the side effect of the traffic channel initialization procedures 308 is that mobile station 102 has confirmed that it can receive forward link transmissions from base station 104 prior to base station 104 transmitting the BS ACK Order 310. Therefore, because mobile station 102 has already confirmed that it can receive forward link frames from base station 104 during the traffic channel initialization procedures 308, base station 104 can begin transmitting the remaining signaling 314 immediately following the transmission of the BS ACK Order 310 and expect that mobile station 102 will receive the information.

Figure 4:
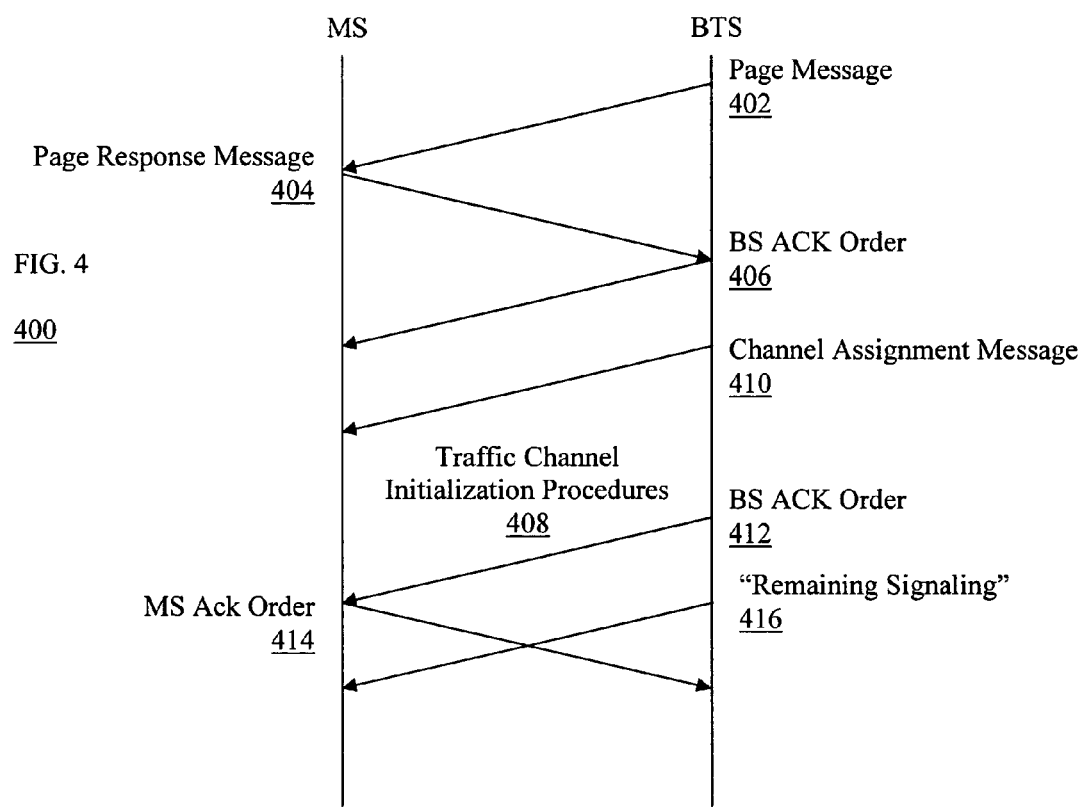
FIG. 4 is a diagram depicting an alternate embodiment of the invention in a wireless communication system.

FIG. 4 is a diagram depicting an alternate embodiment of the enhanced call setup messaging sequence 400 that can be used to initialize the connection between a mobile unit and a base station in a wireless communication system. The vertical axis represents time but is neither uniform nor depicted to scale. The enhanced call setup messaging sequence 400 preferably is sent on the forward link by base station 104 in response to a page response 404 received from mobile unit 102. In the enhanced call setup messaging sequence 300, transmission of the remaining signaling 314 is preferably begun immediately following the BS ACK Order 310, that is, without waiting for the reception of the MS ACK Order 312.

In contrast to the enhanced call setup messaging sequence 300, the enhanced call setup messaging sequence 400 begins with mobile station 102 receiving a page message 402 from base station 104. The mobile station responds with a page response 404. At this point, the messaging sequence continues in a similar manner as messaging sequence 300 described above.

Figure 5:
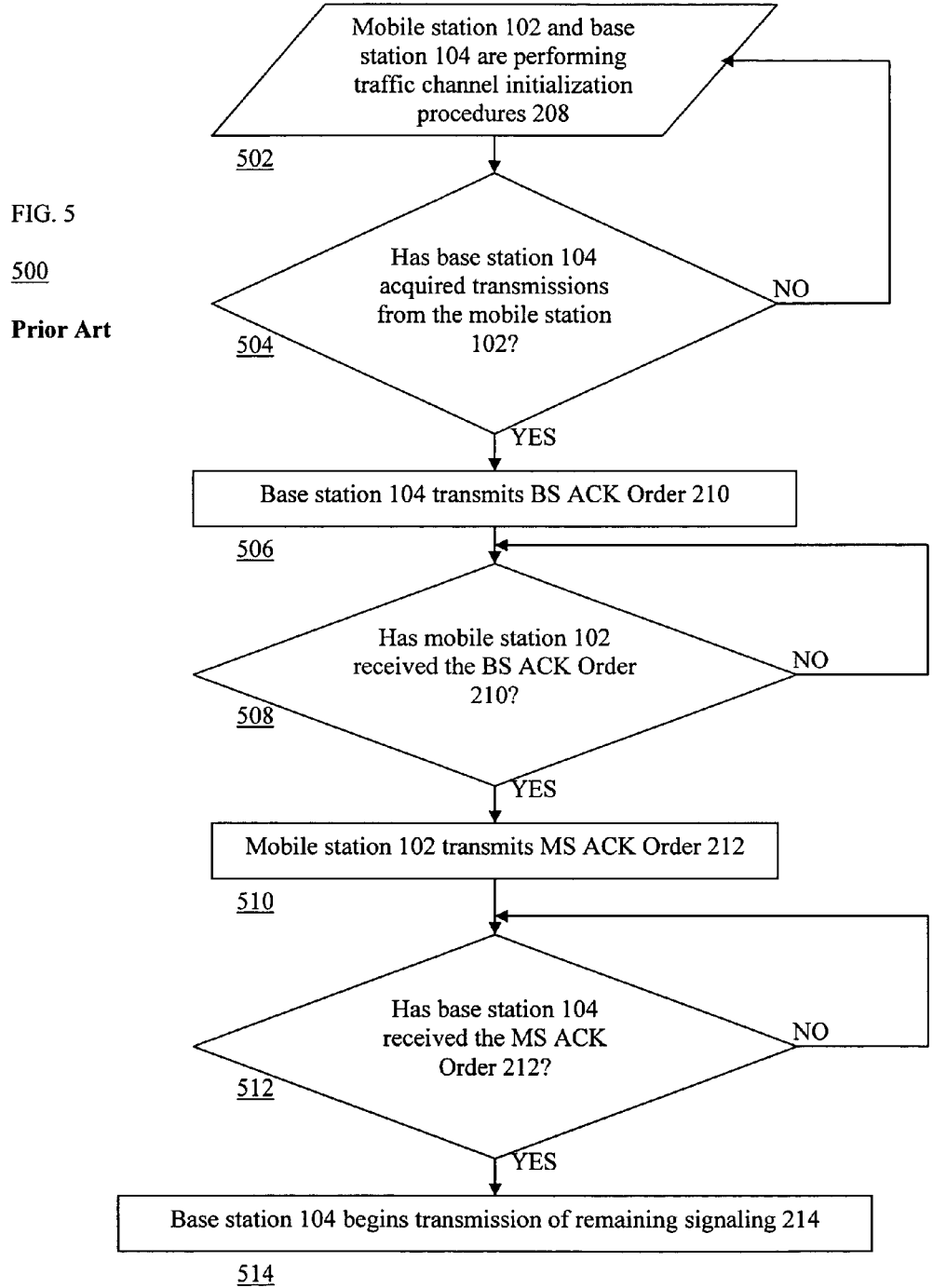
FIG. 5 is a logic flow diagram of a prior art call setup sequence.

FIG. 5 is a logic flow diagram depicting a prior art call setup sequence used to initialize the connection between a mobile unit and a base station in a wireless communication system. Logic flow 500 begins with mobile station 102 and base station 104 performing traffic channel initialization procedures 208 in step 502. Decision point 504 checks to see if base station 104 has acquired transmissions from the mobile station 102. If base station 104 has received these transmissions from the mobile station 104, then the flow progresses on to step 506. In step 506, base station 104 transmits the BS ACK Order 210 to mobile station 102 and then progresses on to decision point 508. In decision point 508, mobile station 102 waits until it has received the BS ACK Order 210 from base station 104. If the mobile station 102 has received the BS ACK Order 210 from the base station 104, the flow progresses on to step 510. In step 510, mobile station 102 transmits the MS ACK Order 212 to base station 104, then progresses on to decision point 512. In decision point 512, base station 104 waits until it has received the MS ACK Order 212 from mobile station 102. If base station 104 has received the MS ACK Order 212 from mobile station 102, the flow progresses on to step 514. In step 514, the base station begins the transmission of the remaining signaling 214.

Figure 6:
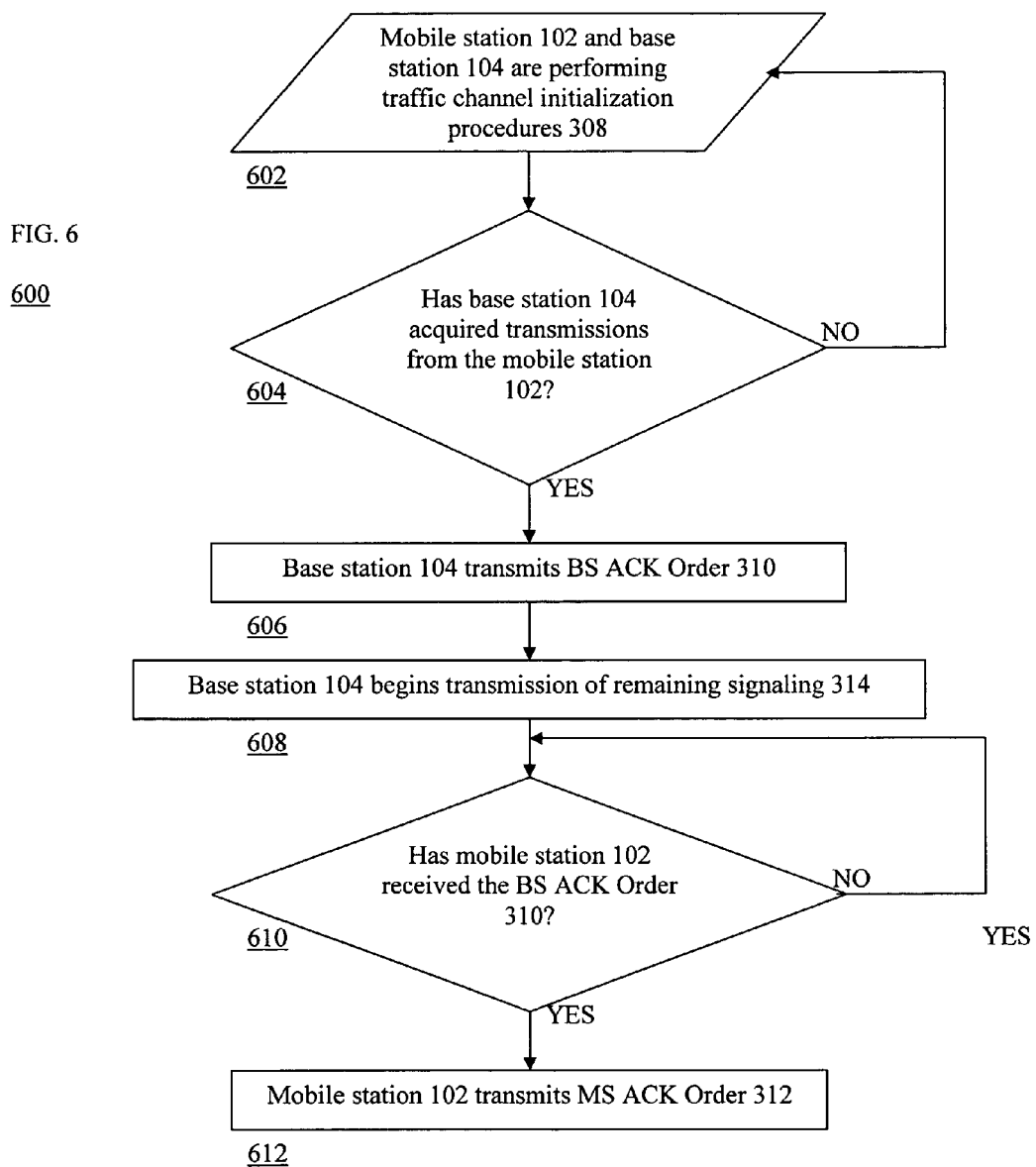
FIG. 6 is a logic flow diagram of an embodiment of the enhanced call setup sequence.

FIG. 6 is a logic flow diagram depicting an embodiment of the call setup sequence that can be used to initialize the connection between a mobile unit and a base station in a wireless communication system. Logic flow 600 begins with mobile station 102 and base station 104 performing traffic channel initialization procedures 308 in step 602. Decision point 604 checks to see if base station 104 has acquired transmissions from mobile station 102. If base station 104 has received these transmissions from mobile station 104, then the flow progresses on to step 606. In step 606, base station 104 transmits the BS ACK Order 310 to mobile station 102, and the flow progresses on to step 608. In step 608, the base station begins the transmission of the remaining signaling 314, but without waiting until it receives the MS ACK Order 212 from mobile station 102. The flow then progresses on to decision point 610. In decision point 610, mobile station 102 waits until it has received the BS ACK Order 310 from base station 104. If mobile station 102 has received the BS ACK Order 310 from base station 104, the flow progresses on to step 612. In step 612, the mobile station transmits the MS ACK Order 312 to the base station 104.

Note that where this disclosure uses the term Page Message, this message may be represented by the Page Message, the General Page Message, or any other message that performs a paging function. Similarly, where the disclosure uses the term Origination Message, this message may be represented by the Origination Message, the Enhanced Origination Message, or any other message that performs an communication origination function. Also, where the disclosure uses the term Channel Assignment Message, this message may be represented by the Channel Assignment Message, the Enhanced Channel Assignment Message, or any other message that performs a channel assignment function. Finally, where the disclosure uses the terms MS ACK Order and BS ACK Order, these messages may be the actual order messages, the representative Link Access Control ping messages, or any other messages that perform these acknowledgment functions.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for reducing call setup time comprising:
    sending a channel assignment message to a mobile station (MS);
    performing traffic channel initialization procedures with the MS;
    after completing traffic channel initialization procedures, sending a base station acknowledgment message to the MS;
    proceeding to transmit signaling to the MS without waiting to receive an MS acknowledgment in response to the base station acknowledgment message;
    after proceeding to transmit signaling to the MS receiving an MS acknowledgement in response to the base station acknowledgment message.

2. The method of claim 1, further comprising:
    receiving, before sending the channel assignment message, an origination message from the MS.

3. The method of claim 2, wherein the origination message comprises a message from the group consisting of an Origination Message and an Enhanced Origination Message.

4. The method of claim 1, further comprising:
    transmitting a page to the MS;
    receiving, in response to the page and before sending the channel assignment message, a page response from the MS.

5. The method of claim 1, wherein proceeding to transmit signaling to the MS comprises transmitting signaling to the MS from the group consisting of service request messaging, service connect messaging, status request messaging, and handoff messaging.

6. The method of claim 1, wherein proceeding to transmit signaling to the MS comprises transmitting to the MS signaling related to functions from the group consisting of service negotiation, data burst handling, handoff processing, and authentication.

7. The method of claim 1, wherein performing traffic channel initialization procedures comprises receiving an indication that the MS is successfully receiving base station messaging to the MS.

8. The method of claim 1, wherein performing traffic channel initialization procedures comprises transmitting forward link frames to the MS.

9. The method of claim 1, wherein performing traffic channel initialization procedures comprises receiving from the MS signaling from the group consisting of a traffic channel preambles reverse pilot frames, and null frames.

10. The method of claim 1, wherein the channel assignment message comprises a message from the group consisting of a Channel Assignment Message and an Enhanced Channel Assignment Message.

11. The method of claim 1, wherein the base station acknowledgment message comprises a message from the group consisting of a BS ACK Order message and a Link Access Control ping message.

12. The method of claim 1, wherein the MS acknowledgment comprises a message from the group consisting of an MS ACK Order message and a Link Access Control ping message.

13. A base station comprising:
    wireless transceiver equipment (WTE) adapted to transmit and receive messaging to a mobile station (MS);
    a controller, communicatively coupled to the WTE,
        adapted to send, via the WTE, a channel assignment message to the MS,
        adapted to perform, via the WTE, traffic channel initialization procedures with the MS,
        adapted to send, via the WTE, a base station acknowledgment message to the MS, after completing traffic channel initialization procedures,
        adapted to proceed to transmit signaling, via the WTE, to the MS without waiting to receive an MS acknowledgment in response to the base station acknowledgment message, and
        adapted to receive, via the WTE, an MS acknowledgment in response to the base station acknowledgment message, after proceeding to transmit signaling to the MS.

14. The base station of claim 13, wherein the controller is further adapted to receive, via the WTE, an origination message from the MS, before sending the channel assignment message.

15. The base station of claim 13, wherein the controller is further
    adapted to transmit, via the WTE, a page to the MS, and
    adapted to receive, via the WTE, a page response from the MS, in response to the page and before sending the channel assignment message.

16. The base station of claim 13, wherein proceeding to transmit signaling to the MS comprises transmitting signaling to the MS from the group consisting of service request messaging, service connect messaging, status request messaging, and handoff messaging.

17. The base station of claim 13, wherein proceeding to transmit signaling to the MS comprises transmitting to the MS signaling related to functions from the group consisting of service negotiation, data burst handling, handoff processing, and authentication.

18. The base station of claim 13, wherein performing traffic channel initialization procedures comprises receiving an indication that the MS is successfully receiving base station messaging to the MS.

* * * * *